(12) United States Patent
Kelderman

(10) Patent No.: US 8,172,492 B1
(45) Date of Patent: May 8, 2012

(54) TIE DOWN BRACKET FOR TYING MOTORCYCLES TO TRAILERS OR TRUCK BEDS

(76) Inventor: Jeffrey J. Kelderman, Oskaloosa, IA (US)

(*) Notice: Subject to any disclaimer, the term of this patent is extended or adjusted under 35 U.S.C. 154(b) by 210 days.

(21) Appl. No.: 12/759,939

(22) Filed: Apr. 14, 2010

(51) Int. Cl.
 *B60P 7/08* (2006.01)
(52) U.S. Cl. ............... 410/3; 410/7; 410/23; 410/97
(58) Field of Classification Search ............ 410/2, 3, 410/4, 7, 12, 30, 21, 23, 97, 100, 102, 116; 224/403, 924, 568; 248/499
See application file for complete search history.

(56) References Cited

U.S. PATENT DOCUMENTS

| 6,195,848 B1 | 3/2001 | Jackson et al. |
| 7,976,254 B2 * | 7/2011 | Murphy ............... 410/3 |

* cited by examiner

*Primary Examiner* — Stephen Gordon
(74) *Attorney, Agent, or Firm* — Sturm & Fix

(57) ABSTRACT

A tie down apparatus for tying a motorcycle down to a trailer or truck bed has a novel U-shaped tie down bracket used in conjunction with tie down straps and a front wheel receiving channel attached to the bed.

13 Claims, 5 Drawing Sheets

US 8,172,492 B1

TIE DOWN BRACKET FOR TYING MOTORCYCLES TO TRAILERS OR TRUCK BEDS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to a tie down bracket for tying motorcycles to trailers or truck beds for transport from place to place, and more particularly to such tie down bracket which is universal to all motorcycles.

2. Description of the Related Art

Motorcycles do not have tie down brackets, so people wanting to secure a motorcycle to a trailer or truck bed often improvise to attach tie down straps on many different parts of a motorcycle such as the handle bars thereof. Such tie down operations are often time consuming and can result in damage to the motorcycle if the motorcycle shifts during transport from place to place or someone attaches a tie down strap to a part of the motorcycle that is not rigid enough for such purpose.

Accordingly there is a need for a universal tie down structure for motorcycles that is easy to install, easy to use, dependable and economical to construct.

BRIEF SUMMARY OF THE INVENTION

A tie down apparatus for tying a motorcycle down to a trailer or truck bed has a novel U-shaped tie down bracket used in conjunction with tie down straps and a front wheel receiving channel attached to the bed.

DETAILED DESCRIPTION OF THE INVENTION

Figure 1:
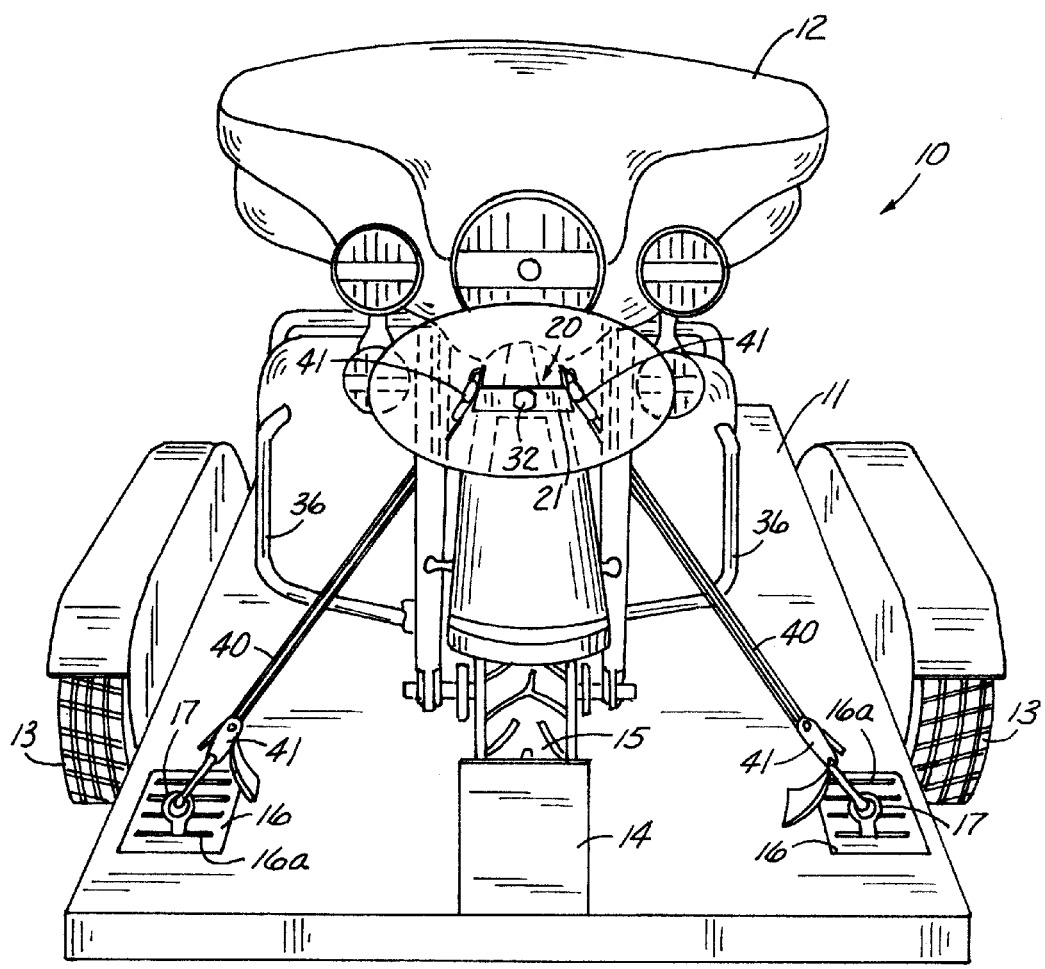
FIG. 1 is a front perspective view of a motorcycle tied down on a trailer bed in accordance with a preferred embodiment of the present invention.

Referring now to the drawings, wherein like reference numerals designate identical or corresponding parts throughout the several views, FIG. 1 shows a preferred embodiment of the present invention 10 having a trailer bed 11 with a motorcycle 12 anchored thereto. The trailer bed 11 is mounted on ground engaging wheels 13. A tongue, not shown, permits the trailer bed 11 to be towed from place to place but it will be understood that the bed 11 could be part of a self propelled vehicle, like a pickup truck, instead of being towed.

Mounted to the top of the trailer, preferably in the front of the trailer bed 11, is a channel 14 for receiving the front tire/wheel 15 of the motorcycle 12. The channel 14 is essentially U-shaped in cross section and has a top portion 14a and a bottom portion 14b. The bottom portion 14b is rigidly secured to the trailer bed 11, such as by threaded fasteners extending through holes in the bottom of the bottom portion 14b and through the bed 11.

Also rigidly attached to the trailer bed 11 are right and left side anchor devices 16 with slots 16a that selectively receive anchor bolts 17 that extend through a selected one of the slots 16a but can be moved to a different slot 16a as is well known in this art.

Figure 5:
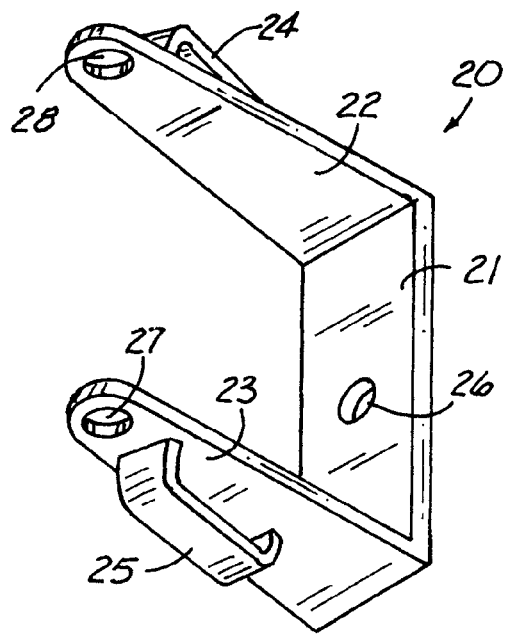
FIG. 5 is a perspective view of the bracket by itself.
Figure 6:
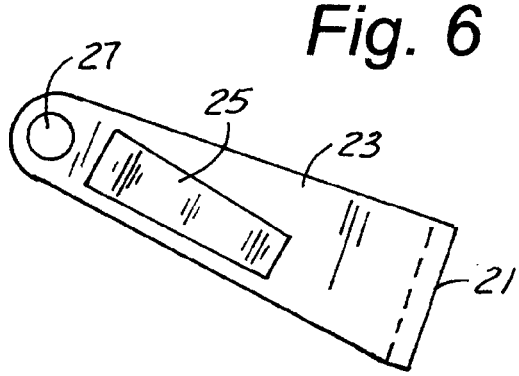
FIG. 6 is an enlarged right side elevational view of the bracket of FIG. 5.
Figure 7:
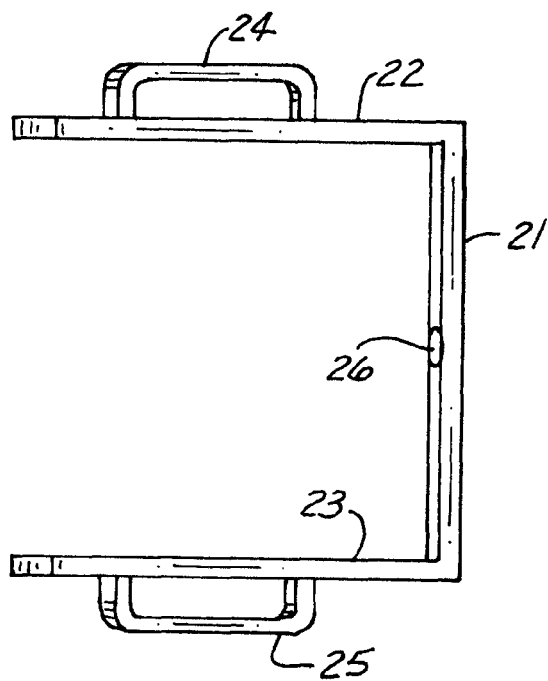
FIG. 7 is an enlarged top plan view of the bracket.

A rigid U-shaped bracket 20 as can best be seen in FIGS. 5-7 is preferably made of steel with a powder coating on it to keep it free of corrosion, for example, though it can be made of other materials as well. A front portion 21 of the U-shaped bracket 20 has two wing members 22 and 23. The left wing member 22 has a U-shaped flange 24 welded to it and the right wing member 23 has a U-shaped flange 25 welded to it.

Figure 3:
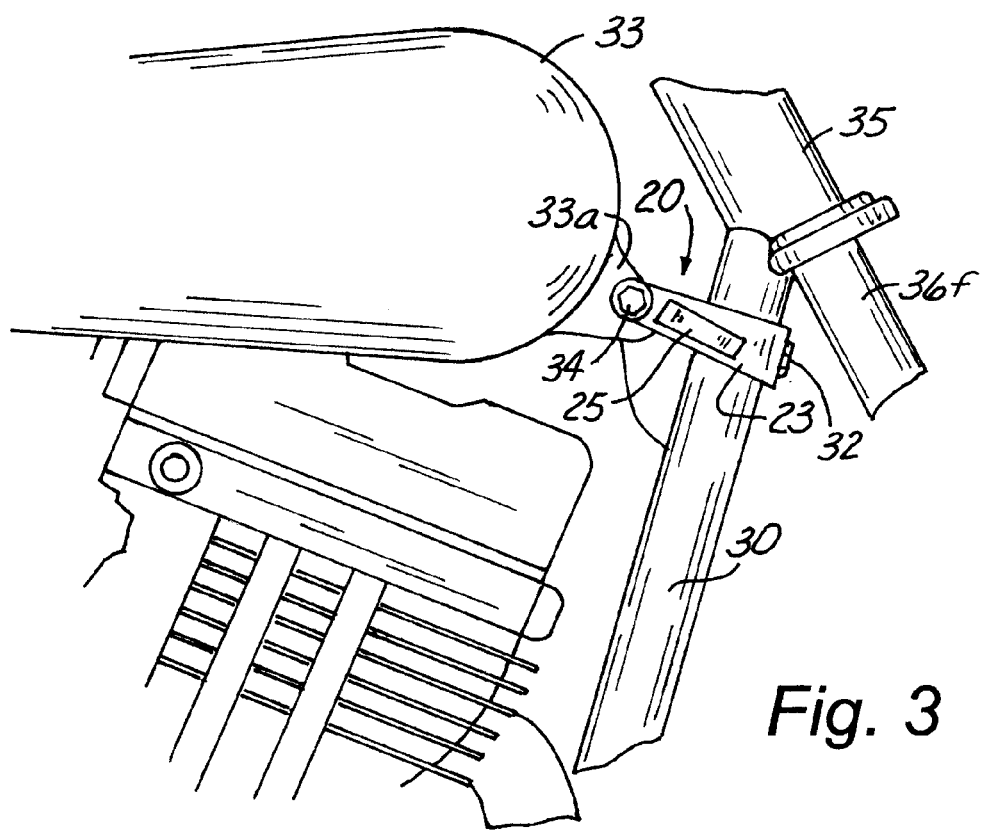
FIG. 3 is an enlarged side elevational view of the bracket, the frame and the fuel tank shown in FIG. 2.
Figure 3A:
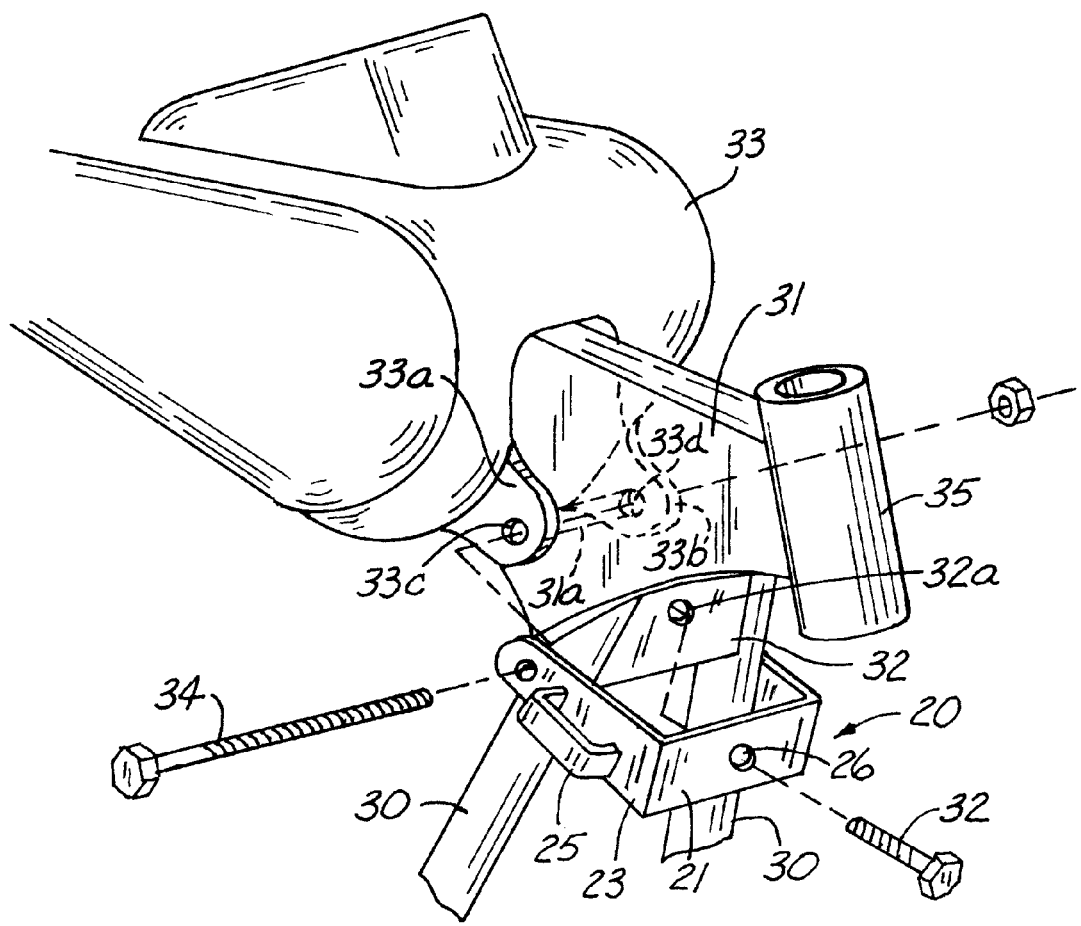
FIG. 3a is an enlarged, exploded, perspective view of the frame, bracket gas tank and threaded fasteners of the preferred embodiment.

The rigid U-shaped bracket 20 is mounted to the motorcycle 12 in the manner shown in FIG. 3a wherein a bolt 32 extends through a hole 26 in front portion 21 of the U-shaped bracket 20. The bolt 32 also extends through an aligned hole 32a in frame part 32 that is welded or otherwise rigidly secured to frame parts 30 and 31. Cylindrical member 35 is welded to frame part 31 for receiving a shaft (not shown) for pivotal attachment of handle bars 36 of the motorcycle 12. This shaft (not shown) connects the handle bars 36 to the fork 36f which extends down on both sides of the wheel 15 and to which the wheel 15 is rotatably mounted at bearing 37 as shown in FIG. 4.

Looking still at FIG. 3a, wing members 22 and 23 are attached to the frame member 31 and fuel tank 33 via a flange 33a on the right side with hole 33c in it and a flange 33b on the left side with hole 33d in it. A bolt or other threaded fastener 34 extends through the openings 27 and 28 in the wing members 22 and 23 respectively, through holes 33c and 33d respectively in fuel tank flanges 33a and 33b and through hole 31a in frame member part 31. Threaded nut 34a is threadably attached to the threaded bolt 34.

Figure 2:
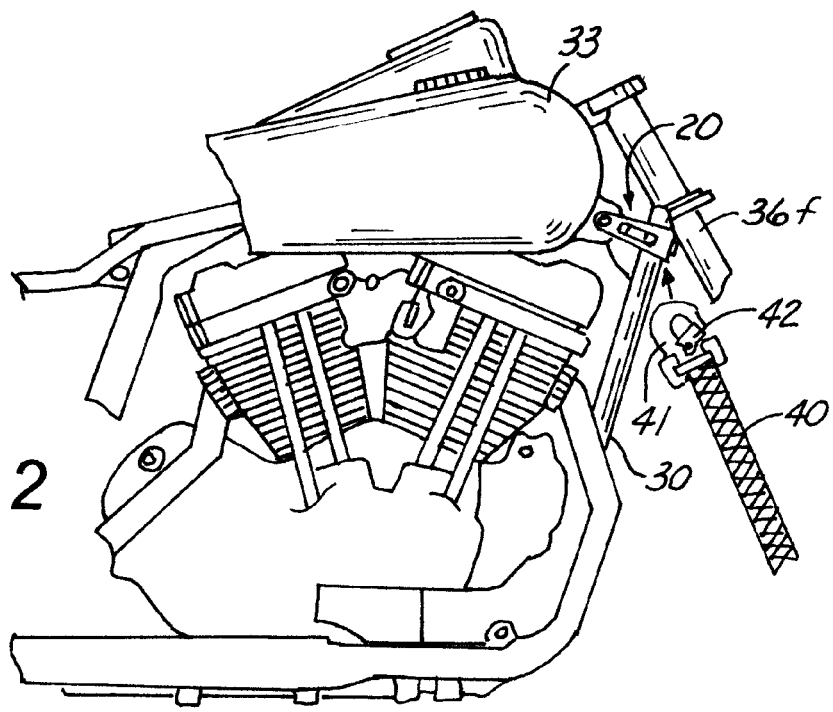
FIG. 2 is a partial side view of the embodiment of FIG. 1, showing a bracket attached to a motorcycle frame and to a fuel tank and with an upper portion of a right side tie down strap in readiness to be attached thereto.

A right side tie down strap 40 is identical to the left side tie down strap 40. The top of each tie down strap 40 has a hook 41. The hook 41 can optionally have a spring biased member 42 that can be pushed out of the way when attaching or detaching the hook 41 over and through U-shaped members 24/25 for example as shown in FIGS. 2 and 4. The bottom of each tie down strap 40 is connected to the loop 17 in the anchor device 16, for example via a triangular "ring" 19, though other ways of connecting the lower part of strap 40 to the anchor 17 can be used as well, such as substituting a hook like the hook 41 that is connected to the top of strap 40 for the triangular shaped "ring" 19 shown in FIGS. 1 and 4.

Figure 4:
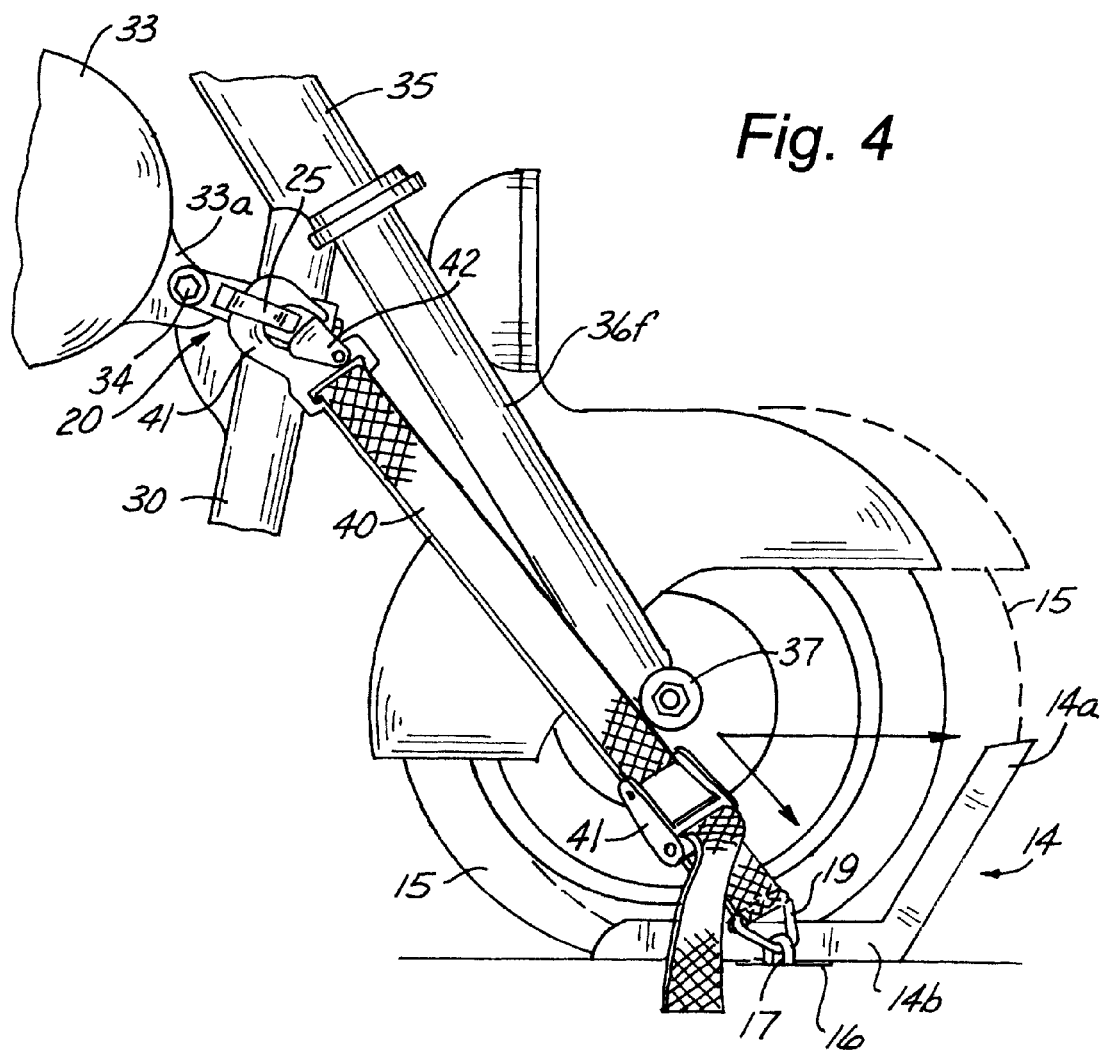
FIG. 4 is an enlarged side elevational view of the bracket, the frame, the fuel tank and front wheel on the bed of the trailer and also showing a channel attached to the bed of the trailer for receiving the front wheel all in solid lines and how tightening the tie down straps pulls the motorcycle wheel forwardly into abutment with the channel at the same time that the frame of the motorcycle has a downwardly force on it.

Once the motorcycle 12 is on the bed 11 and in the position shown in solid lines in FIG. 4, the straps 40 would be tightened using ratchet mechanism 41, for example. These ratchet mechanisms can be like that shown in U.S. Pat. No. 6,195,848 to Jackson et al., which patent is incorporated herein by reference in its entirety. Other tightening mechanisms commonly used to securely tie down and tighten tie down straps for tying items down on a trailer bed or truck bed can be used instead of the ratchet mechanism 41 if desired.

Obviously many modifications and variations of the present invention are possible in light of the above teachings. It is therefore to be understood that, within the scope of the appended claims, the invention may be practiced otherwise than as specifically described.

I claim:

1. Apparatus comprising:
   a bed having a front portion and a rear portion, the bed comprising;
      ground engaging wheels operatively attached to the bed for permitting the bed to move from place to place on public roads;
      a channel operatively attached to the bed and having a portion extending upwardly for receiving and abutting a front wheel of a motorcycle;
   a motorcycle comprising:
      a frame having front and a rear portions;
      the front wheel rotatably attached to the front portion of the frame, the front wheel being disposed in the channel of the bed;
      a rear wheel rotatably attached to the rear portion of the frame;
      a fuel tank rigidly attached to the frame between the front and the rear portions thereof;
   a tie down bracket operatively attached to the frame, said bracket comprising:
      a front portion of the tie down bracket operatively attached to the frame at a place in front of the fuel tank;
      a left side portion operatively attached to a left side of the front portion of the tie down bracket, the left side portion extending rearwardly from the front portion of the tie down bracket;
      a right side portion operatively attached to a right side of the front portion of the tie down bracket, the right side portion extending rearwardly from the front portion of the tie down bracket;
      an opening disposed in the left side portion of the tie down bracket;
      an opening disposed in the right side portion of the tie down bracket;
      a left side tie down strap having a first end disposed in the opening in the left side portion of the tie down bracket, the left side tie down strap having another end operatively anchored to the bed on a left side of the motorcycle, the another end being anchored to the left of the bracket and forwardly of the motorcycle fuel tank to create a forward force of the front motorcycle wheel against the bracket when the left side tie down strap is tightened; and
      a right side tie down strap having a first end disposed in the opening in the right side portion of the tie down bracket, the right side tie down strap having another end operatively anchored to the bed on a right side of the motorcycle, the another end of the right strap being anchored to the right of the bracket and forwardly of the motorcycle fuel tank to create a force of the front motorcycle wheel against the bracket when the right side tie down strap is tightened.

2. The apparatus of claim 1 wherein the front portion of the tie down bracket has a hole therein, the motorcycle frame has an opening there through and a first fastener extends through the hole in the front portion of the tie down bracket and through the opening in the motorcycle frame for securing the front portion of the tie down bracket to the frame.

3. The apparatus of claim 2 wherein the left and right side portions of the tie down bracket have aligned holes therein and a front portion of the fuel tank has an opening therein aligned with the aligned holes in the tie down bracket, and a second fastener extending through the aligned holes in the bracket and the fuel tank front portion opening for further securing the tie down bracket securely to the motorcycle frame.

4. The apparatus of claim 1 wherein the left side tie down strap includes a ratchet for selectively tightening and holding the left side portion of the tie down bracket to a left side of the bed.

5. The apparatus of claim 4 wherein the right side tie down strap includes a ratchet for selectively tightening and holding the right side portion of the tie down bracket to a right side of the bed.

6. The apparatus of claim 1 wherein the left side tie down strap includes a left side hook extending through the opening in the left side portion of the tie down bracket.

7. The apparatus of claim 6 wherein the right side tie down strap includes a right side hook extending through the opening in the right side portion of the tie down bracket.

8. The apparatus of claim 7 wherein the left side tie down strap includes a second left side hook extending through an opening in a left side anchor secured to a left side of the bed.

9. The apparatus of claim 8 wherein the right side tie down strap includes a second right side hook extending through an opening in a right side anchor secured to a right side of the bed.

10. The apparatus of claim 1 wherein the opening in the left side portion is formed by a U-shaped member rigidly attached to the left side portion of the tie down bracket.

11. The apparatus of claim 10 wherein the opening in the right side portion is formed by a U-shaped member rigidly attached to the right side portion of the tie down bracket.

12. The apparatus of claim 1 wherein the right side tie down strap includes a ratchet mechanism for tightening the right side tie down strap.

13. The apparatus of claim 1 wherein the left side tie down strap includes a ratchet mechanism for tightening the left side tie down strap.

* * * * *